United States Patent
Fujii et al.

(10) Patent No.: US 10,578,775 B2
(45) Date of Patent: Mar. 3, 2020

(54) FILM STRUCTURAL MEMBER

(71) Applicant: Panasonic Intellectual Property Management Co., Ltd., Osaka (JP)

(72) Inventors: Keitaro Fujii, Osaka (JP); Teppei Iwase, Hyogo (JP); Yuji Yamamoto, Osaka (JP); Nobuyuki Kamikihara, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/901,004

(22) Filed: Feb. 21, 2018

(65) Prior Publication Data

US 2018/0267209 A1    Sep. 20, 2018

(30) Foreign Application Priority Data

Mar. 17, 2017  (JP) .................... 2017-053431

(51) Int. Cl.
*G02B 1/11* (2015.01)
*G06F 3/044* (2006.01)
*G06F 3/041* (2006.01)
*G02B 5/02* (2006.01)

(52) U.S. Cl.
CPC .............. *G02B 1/11* (2013.01); *G02B 5/0226* (2013.01); *G06F 3/041* (2013.01); *G06F 3/044* (2013.01); *G06F 2203/04102* (2013.01)

(58) Field of Classification Search
CPC ......... G02B 1/11; G02B 5/0226; G06F 3/041; G06F 3/044; G06F 2203/04102
See application file for complete search history.

(56) References Cited

U.S. PATENT DOCUMENTS

| | | | |
|---|---|---|---|
| 9,990,085 B2 * | 6/2018 | Kobayashi | G06F 3/041 |
| 10,420,207 B2 * | 9/2019 | Frey | G02B 1/116 |
| 2010/0027124 A1 * | 2/2010 | Nagahama | G02B 5/0226 359/599 |
| 2013/0299214 A1 * | 11/2013 | Frey | H05K 9/0096 174/253 |
| 2014/0251673 A1 * | 9/2014 | Cok | G06F 3/041 174/261 |
| 2014/0318836 A1 * | 10/2014 | He | G02F 1/1333 174/257 |
| 2015/0242012 A1 * | 8/2015 | Petcavich | G06F 1/1652 345/174 |
| 2015/0268770 A1 * | 9/2015 | Cok | G06F 3/047 345/174 |
| 2017/0309364 A1 * | 10/2017 | Yamada | G02B 1/118 |

FOREIGN PATENT DOCUMENTS

JP    2015-103223    6/2015

* cited by examiner

*Primary Examiner* — Mihir K Rayan
(74) *Attorney, Agent, or Firm* — Wenderoth, Lind & Ponack, L.L.P.

(57) ABSTRACT

A film structural member includes a recessed portion on a transparent substrate, metal wiring on a base of the recessed portion, and a particle layer on the metal wiring. The particle layer is configured as an aggregate of particles having an average particle diameter of 300 nm or smaller.

14 Claims, 5 Drawing Sheets

FILM STRUCTURAL MEMBER

TECHNICAL FIELD

The present disclosure relates to a film structural member.

BACKGROUND

Examples of processes of manufacturing a film structural member provided with metal wiring on a transparent substrate include a process of providing a blackened layer on the metal wiring for improving visibility of a film.

The process of providing the blackened layer on the metal wiring will be described with reference to FIG. 8. In FIG. 8, metal layers 4 are provided on transparent substrate 2, blackened assistance layer 6 is provided on metal layer 4, and blackened layer 5 is provided on blackened assistance layer 6. In this manner, by providing blackened layer 5 on metal layer 4 of transparent substrate 2, reflectance of metal layer 4 is reduced. Therefore, the visibility improves. Such a method is described in Japanese Patent Unexamined Publication No. 2015-103223 in detail.

However, in the method of providing the blackened layer on the metal wiring according to an example of the related art, there is a disadvantage that breaking of wiring occurs when the transparent substrate is bent. More specifically, since toughness of copper nitride that is the blackened layer is low, when the transparent substrate is bent, even the metal wiring under the blackened layer is broken due to the breakage of the blackened layer. Therefore, the bending of the transparent substrate is strictly disallowed.

SUMMARY

The present disclosure is made in view of the above disadvantage of the related art. An object of the present disclosure is to provide a film structural member that can improve visibility and can cope with a bendable device.

The film structural member according to the present disclosure includes a recessed portion formed on a transparent substrate, metal wiring provided on a base of the recessed portion, and a particle layer that is provided on the metal wiring and is configured as an aggregate of particles having an average particle diameter of 300 nm or smaller.

As described above, according to the film structural member of the present disclosure, it is possible to improve visibility and cope with a flexible device.

DETAILED DESCRIPTION OF PREFERRED EMBODIMENTS

Embodiment 1

Hereinafter, Embodiment 1 of the present disclosure will be described with reference to FIGS. 1 to 7.

Figure 1:
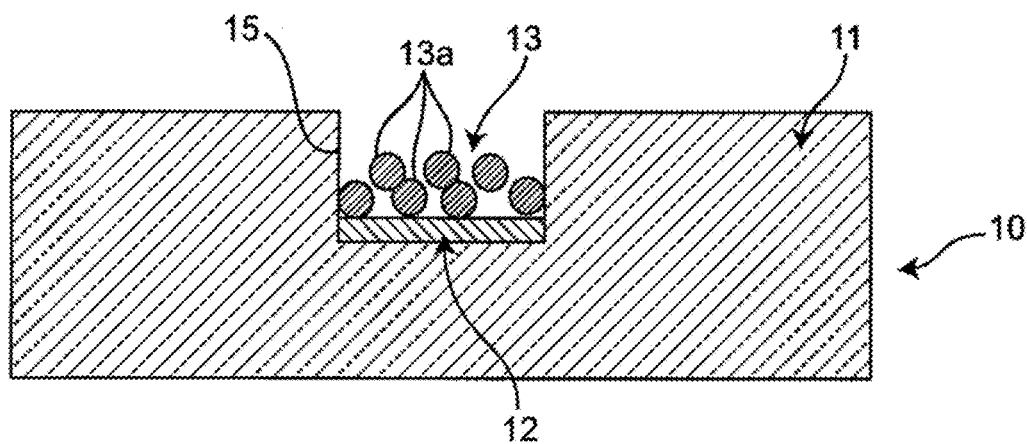
FIG. 1 is a schematic diagram illustrating a portion of a cross section of a film structural member in a thickness direction, according to Embodiment 1 of the present disclosure.

FIG. 1 shows a schematic diagram illustrating a portion of a cross section of film structural member 10 in a thickness direction, according to Embodiment 1 of the present disclosure. Film structural member 10 is mainly used for a capacitance type sensor used in, for example, a touch panel of a laptop computer, a tablet, or the like.

Film structural member 10 includes recessed portion 15 formed on transparent substrate 11, metal wiring 12 provided on a base of recessed portion 15, and particle layer 13 that is provided on metal wiring 12 and is configured as an aggregate of a plurality of particles 13a.

In FIG. 1, transparent substrate 11 is formed of polyethylene terephthalate (PET) resin or polycarbonate resin. A thickness of transparent substrate 11 is 20 µm or larger in order to secure processability, and 100 µm or smaller in order to secure flexibility.

A plurality of recessed portions 15 (only one recessed portion 15 is illustrated in FIG. 1) is formed on transparent substrate 11. In order to clearly illustrate recessed portion 15, only one recessed portion 15 is enlarged and illustrated in FIG. 1. A depth of recessed portion 15 is equal to or larger than 1 µm and equal to or smaller than 2 µm in order to secure processability. A width of recessed portion 15 is equal to or larger than 2 µm and equal to or smaller than 3 µm in order to secure visibility.

Metal wiring 12 having the same width as the width of the base of recessed portion 15 is provided on the base of recessed portion 15. Metal wiring 12 is formed of Cu or Ag. A thickness of metal wiring 12 is 200 nm or larger in order to exhibit sufficiently small electric resistance to ensure the quality of a touch panel.

Particle layer 13, that is an aggregate of a plurality of fine particles 13a, is provided on metal wiring 12. Although details will be described later, an average particle diameter of fine particles 13a is 300 nm or smaller.

Film structural member 10 includes transparent substrate 11 having a plurality of recessed portions 15, metal wiring 12, and particle layer 13.

Since particle layer 13 reduces reflectance of metal wiring 12, similar to a blackened layer, particle layer 13 improves visibility of film structural member 10. In addition, since particle layer 13 is the aggregate of fine particles 13a, it is possible to maintain flexibility without breakage when the transparent substrate is bent.

Figure 2:
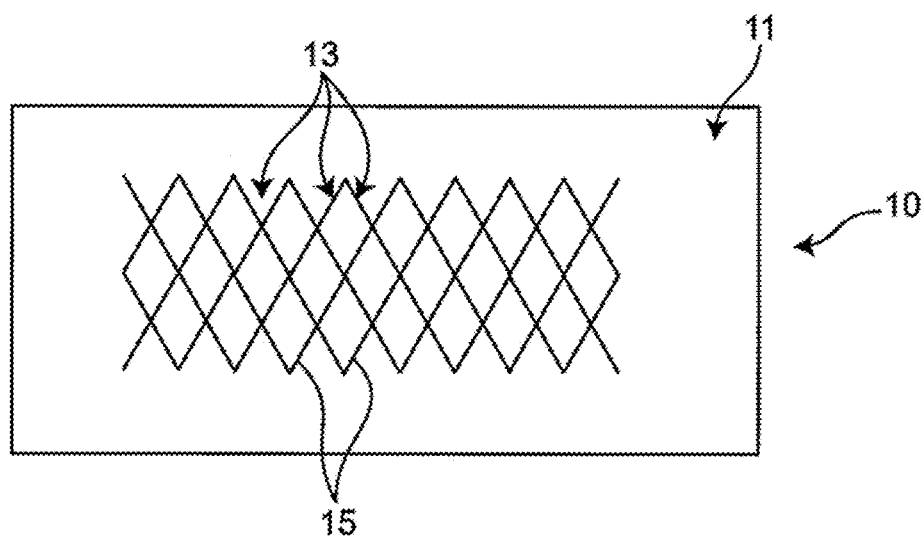
FIG. 2 is a schematic diagram illustrating a whole image of the film structural member viewed from a top, according to Embodiment 1 of the present disclosure.

FIG. 2 shows a schematic plan view of a whole image of film structural member 10 viewed from a top, according to Embodiment 1 of the present disclosure. Although metal wiring 12 is spread on transparent substrate 11, for example, in a rhombic lattice pattern, particle layer 13 is provided on metal wiring 12. Therefore, when viewed from a top, metal wiring 12 is invisible and particle layer 13 is visible.

Figure 3:
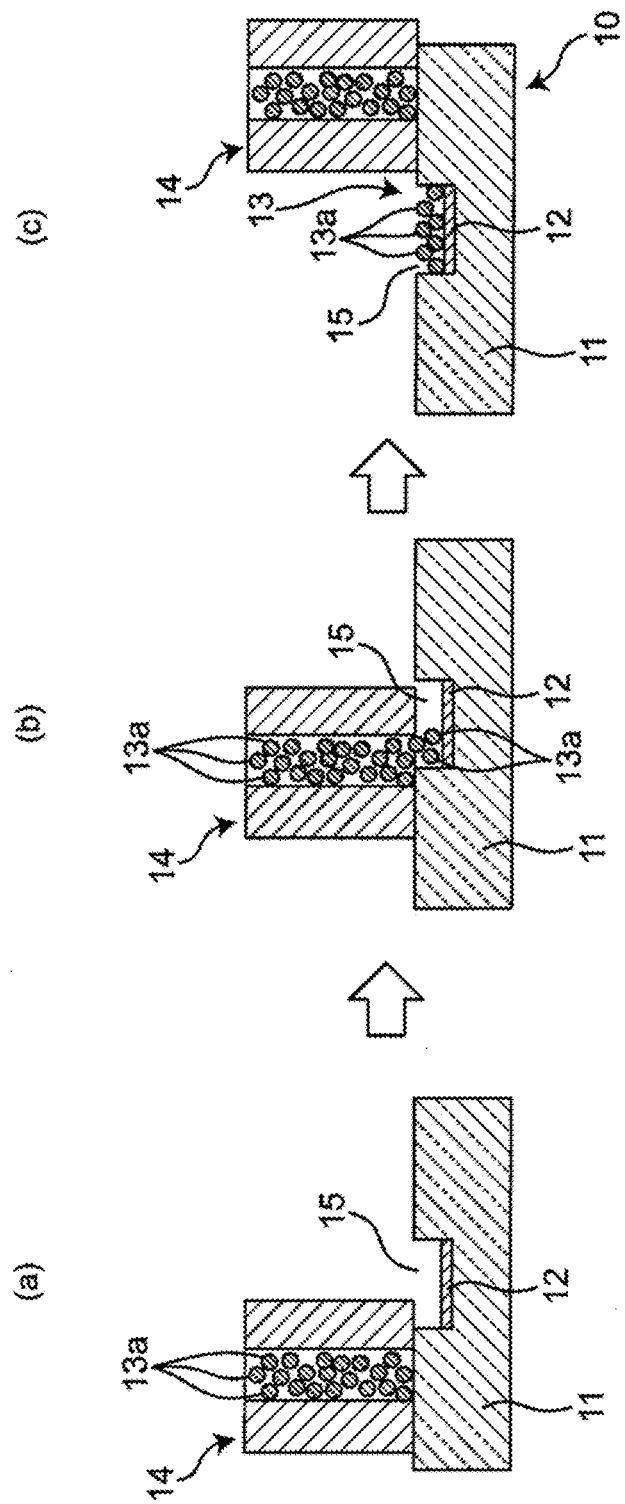
FIG. 3 is a schematic diagram illustrating a manufacturing method for the film structural member, according to Embodiment 1 of the present disclosure.

FIG. 3 shows a schematic diagram illustrating a manufacturing method for film structural member 10, according to Embodiment 1 of the present disclosure. First, in (a) of FIG. 3, particle supplier 14 of which an inside is filled with fine particles 13a is disposed on transparent substrate 11 in a vicinity of recessed portion 15. Then, in (b) and (c) of FIG. 3, particles 13a are poured into recessed portion 15 by flat plate coating of particle supplier 14, thereby providing particle layer 13 on metal wiring 12.

Since particle supplier 14 moves while being in close contact with a surface layer of transparent substrate 11, fine particles 13a are poured only into recessed portion 15 formed in transparent substrate 11 and particle layer 13 is provided only on metal wiring 12.

Figure 4:
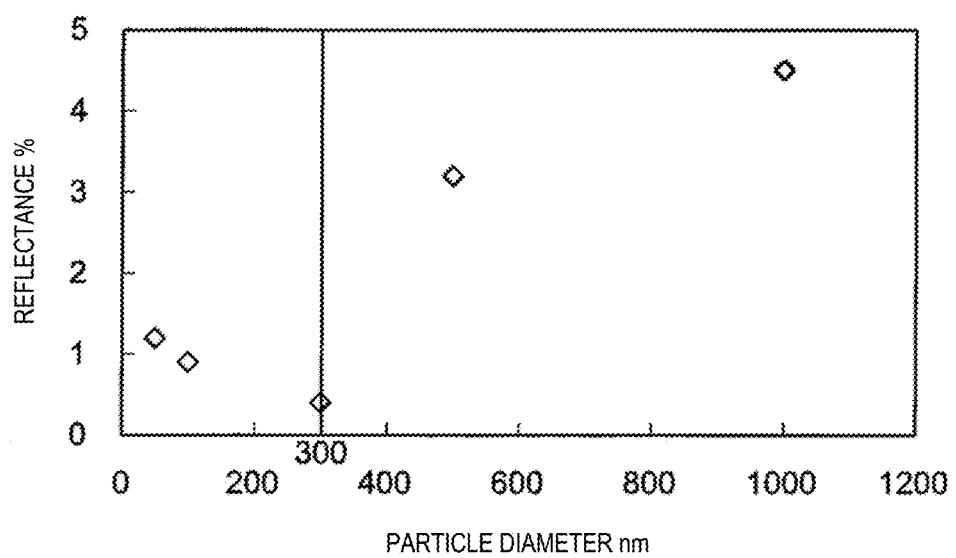
FIG. 4 is a graph illustrating a relation between a particle diameter and reflectance in the film structural member, according to Embodiment 1 of the present disclosure.

Here, a particle diameter of particles 13a of particle layer 13 effective for decreasing reflectance will be described. Each plot in the graph of FIG. 4 shows a relation between reflectance when particle layer applied on a flat plate is irradiated with light rays having a wavelength of 400 nm and an average particle diameter of particles of the particle layer. It is difficult to suppress reflection of visible light as the wavelength of the visible light becomes shorter. Therefore, if reflection of violet light having a wavelength of 400 nm that is the shortest class in the visible light that can be suppressed, it is considered that the reflection of the visible light can be suppressed. That is, it is considered that visibility can be improved.

As shown in the graph of FIG. 4, when the average particle diameter is 300 nm or smaller, reflectance is lower than 1%. The reflectance is greatly reduced to an extent that 80% reflectance is reduced compared to a case where the average particle diameter is 1000 nm. In a case of a smaller particle diameter, an effect that the reflectance slightly increases to an extent that 75% reflectance is reduced compared to a case where the average particle diameter is 1000 nm is obtained. That is, particle layer 13 having the average particle diameter of 300 nm can reduce reflectance by nearly 80%. The average particle diameter was measured, while stirring in a batch cell, using a laser diffraction/scattering type particle diameter distribution analyzer LA-600 (manufactured by HORIBA, Ltd.).

Figure 5:
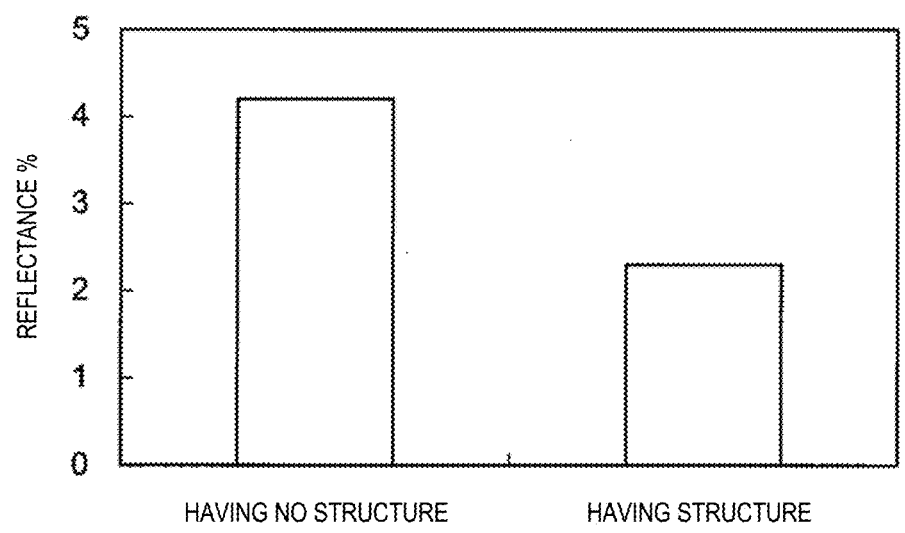
FIG. 5 is a graph illustrating a relation between presence or absence of a particle layer and reflectance in the film structural member, according to Embodiment 1 of the present disclosure.

In film structural member 10 shown in FIGS. 1 and 2, reflectance was compared by irradiating the film structural member with light rays having a wavelength of 400 nm, between film structural member 10 including particle layer 13 formed of particles 13a having an average particle diameter of 300 nm and a film structural member not having particle layer 13. Then, an effect as below was obtained. That is, as shown in the graph of FIG. 5, reflectance of film structural member 10 including particle layer 13 (refer to "having structure" in FIG. 5) shows 2%, that is reduced by half from 4% of reflectance of the film structural member not having particle layer 13 (refer to "having no structure" in FIG. 5). A proportion of an area of transparent substrate 11 occupying the upper surface of film structural member 10 in a plan view is 95%, and reflectance of transparent substrate 11 is approximately 1.5%. Therefore, metal wiring 12 strongly affects a result that reflectance, in a case of not having particle layer 13, is 4%. On the other hand, transparent substrate 11 rather than metal wiring 12 strongly affects a result that reflectance, in a case of having particle layer 13, is 2%.

Accordingly, by providing particle layer 13, it is found that film structural member 10 is improved in that reflectance close to the reflectance of transparent substrate 11 is obtained.

Figure 6:
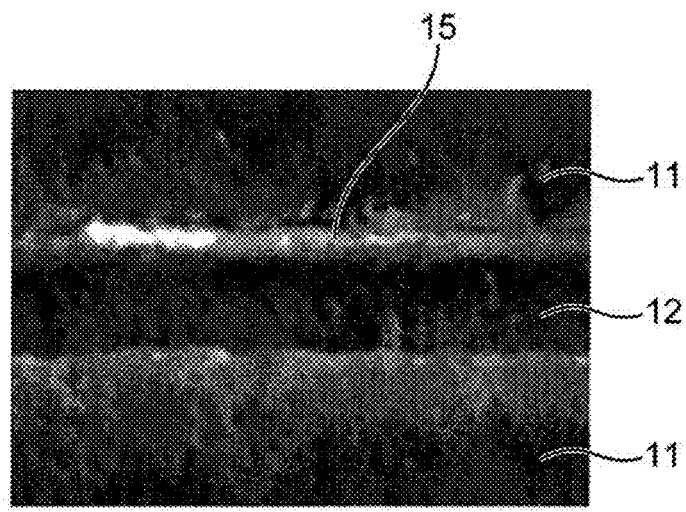
FIG. 6 is a photograph of the film structural member not having the particle layer, according to Embodiment 1 of the present disclosure.

FIG. 6 shows a photograph of film structural member 10 not having particle layer 13 viewed from a top. Since nothing is present on metal wiring 12 provided on a groove base of recessed portion 15, metallic luster from metal wiring 12 is not blocked. Therefore, reflectance increases, and visibility through the film structural member deteriorates.

Figure 7:
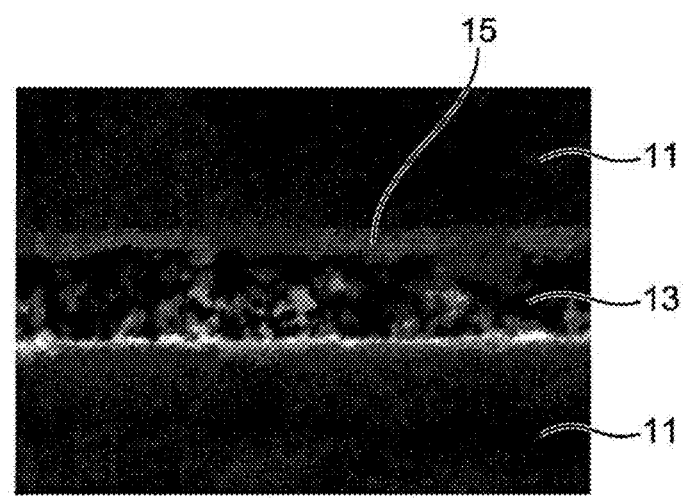
FIG. 7 is a photograph of the film structural member having the particle layer, according to Embodiment 1 of the present disclosure.
Figure 8:
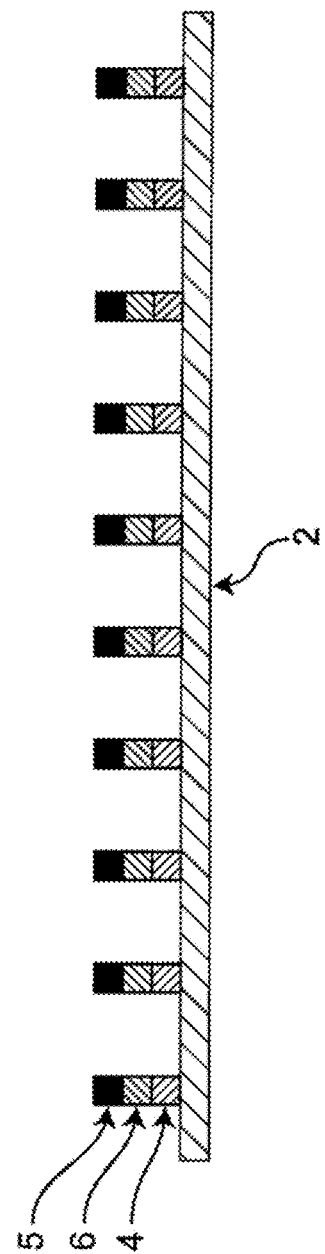
FIG. 8 is a schematic diagram illustrating a configuration of a film structural member according to an example of the related art.

FIG. 7 shows a photograph of film structural member 10 having particle layer 13 viewed from a top. It can be seen, from the photograph, that metallic luster from metal wiring 12 is blocked by particle layer 13. Accordingly, apparent reflectance of the metal wiring 12 is reduced and visibility through the film structural member improves.

As described above, it is considered that reduction in the reflectance of film structural member 10 by providing particle layer 13 is due to a property that a structural member having a certain periodic structure does not generate a diffracted ray with respect to a light ray of a specific frequency. This will be described in detail.

As a condition of a grating period in which a diffracted ray is not generated, a condition in which the grating period is smaller than a quotient obtained by dividing the light wavelength in vacuum by the reflectance is known. It is considered that great reduction in the reflectance in a vicinity of an average particle diameter of 300 nm in FIG. 4 is due to the condition. It is considered that due to such an effect, as shown in FIG. 5, the reflectance was reduced in film structural member 10 including particle layer 13, according to the present disclosure.

In Embodiment 1 of the present disclosure described above, as an example of a material of fine particle 13a, it is desirable to use alumina that can be refined to have a particle diameter of 300 nm or smaller and has a stable particle shape. Silica having the same feature as the feature of the alumina is also suitable for use.

In addition, it is desirable to configure particle layer 13 such that, among all the particles 13a of the particle layer 13, a proportion of particles 13a each having a particle diameter falling within ±25% of the average particle diameter occupies 80% or higher of particle layer 13 in terms of a volume ratio. By using such particles 13a, large particles among the particles each having a particle diameter falling within ±25% of the average particle diameter are present in a lower layer as lower layer particles. Small particles among the particles each having a particle diameter falling within ±25% of the average particle diameter moves to an upper layer corresponding to a size of lower layer particles to some extent. Therefore, the smallest particle is likely to be settled on the largest particle. In this case, since a layer thickness approximately matches with twice the average particle diameter, a fine structure of particle layer 13 is periodic with high accuracy and visibility can be further improved. That is, the thickness of particle layer 13 is at least a thickness approximately matching with twice the average particle diameter. For example, in a case where the average particle diameter is equal to or larger than 200 nm and equal to or smaller than 300 nm, the thickness of particle layer 13 is equal to or larger than 400 nm and equal to or smaller than 600 nm. In addition, since particles each having a particle diameter deviating from ±25% of the average particle diameter is lower than 20% in terms of a volume ratio, recessed portion 15 having the width of 2 μm is not filled with the particles, and the particles are less likely to affect the visibility of human eyes.

In addition, in Embodiment 1 of the present disclosure described above, a case where a width of an opening of recessed portion 15 of transparent substrate 11 is approximately the same with a width of metal wiring 12 is exemplified. However, in order to increase retention of particle layer 13, it is desirable that the width of the opening of recessed portion 15 of transparent substrate 11 is narrower than a width of metal wiring 12.

In addition, in Embodiment 1 of the present disclosure described above, a case where the average particle diameter of fine particles 13a of particle layer 13 is 300 nm is exemplified. However, in order to realize low reflectance that results in excellent visibility, it is desirable that the average particle diameter of fine particles 13a is equal to or larger than 200 nm and equal to or smaller than 300 nm. As shown in FIG. 4, when the average particle diameter of the fine particles reached 300 nm, the reflectance greatly reduced to an extent that 80% or higher reflectance is reduced compared to a case where the average particle diameter is 1000 nm. Further, when the average particle diameter is small, the reflectance slightly increases. Therefore, in order for the reflectance reduction effect due to the aggregate of fine particles 13a to exceed 80% (with reference to a case where the average particle diameter is 1000 nm), it is required that the average particle diameter is set to 300 nm or smaller. On the other hand, in a manufacturing method for film structural member 10 shown in FIG. 3, in order to not spoil an appearance, it is required to prevent fine particles 13a from remaining between the particle supplying surface of particle supplier 14 and the upper surface of transparent substrate 11. Therefore, it is required that the average particle diameter of fine particles 13a is equal to or larger than 200 nm that is a total value of the geometric tolerances between the particle supply surface of particle supplier 14 and the upper surface of transparent substrate 11.

In addition, it is desirable that the thickness of particle layer 13 is larger than 500 nm which allows the particles 13a having a particle diameter of 300 nm to cover and conceal metal wiring 12 in the closest packing manner. In order to secure retention of particle layer 13, in FIG. 1, it is desirable that the thickness of particle layer 13 is smaller than 1800 nm which is the difference between the largest depth of 2000 nm of recessed portion 15 and the smallest thickness of 200 nm of metal wiring 12, such that particles 13a of particle layer 13 do not protrude beyond a surface of transparent substrate 11. In other words, in order to protect particle layer 13, the depth of recessed portion 15 is set to be larger than a total thickness of a thickness of metal wiring 12 and a thickness of particle layer 13.

According to Embodiment 1, film structural member 10 is configured to dispose particle layer 13 that is an aggregate of fine particles 13a on metal wiring 12 of the base of recessed portion 15 of transparent substrate 11. Accordingly, particle layer 13 reduces reflectance of metal wiring 12 similarly to a blackened layer so as to improve visibility of film structural member 10. In addition, since particle layer 13 is the aggregate of fine particles 13a, it is possible to maintain flexibility without breakage when the transparent substrate is bent. As a result, film structural member 10 can improve visibility and cope with a flexible device that is bendable.

By suitably combining any of embodiments or modification examples of the various embodiments or modification examples, it is possible to achieve respective effects of components. In addition, combination of embodiments, combination of the examples, or combination of embodiments and the examples are possible and combination of features indifferent embodiments or examples are also possible.

According to the film structural member of the present disclosure, the film structural member can be applied to a wearable terminal such as, for example, a touch panel requiring flexibility or a smartwatch fitting for a living body.

Although the present disclosure has been described with reference to the aforementioned embodiments, this description is not meant to be construed in a limiting sense. Various modifications of the disclosed embodiments as well as alternative embodiments of the invention will become apparent to persons skilled in the art. It is therefore contemplated that the appended claims will cover any such modifications or embodiments.

What is claimed is:

1. A film structural member comprising:
   a recessed portion on a transparent substrate, the recessed portion having a base;
   a metal wiring on the base of the recessed portion; and
   a particle layer on the metal wiring, the particle layer being configured as an aggregate of particles having an average particle diameter of at least 200 nm and no greater than 300 nm.

2. The film structural member of claim 1,
   wherein each of the particles includes alumina or silica.

3. The film structural member of claim 1,
   wherein a width of an opening of the recessed portion is narrower than a width of the metal wiring.

4. The film structural member of claim 1,
   wherein a depth of the recessed portion is larger than a total thickness of a thickness of the metal wiring and a thickness of the particle layer.

5. The film structural member of claim 1,
   wherein the transparent substrate includes a polyethylene terephthalate (PET) resin or a polycarbonate resin.

6. The film structural member of claim 5,
   wherein a thickness of the transparent substrate is at least 20 μm and no greater than 100 μm.

7. A flexible touch panel comprising the film structural member of claim 6.

8. A film structural member comprising:
   a recessed portion on a transparent substrate, the recessed portion having a base;
   a metal wiring on the base of the recessed portion; and
   a particle layer on the metal wiring, the particle layer being configured as an aggregate of particles having an average particle diameter of 300 nm or smaller,
   wherein, among all the particles of the particle layer, a proportion of particles each having a particle diameter falling within ±25% of the average particle diameter is 80% or higher of the particle layer in terms of a volume ratio.

9. The film structural member of claim 8,
   wherein each of the particles includes alumina or silica.

10. The film structural member of claim 8,
    wherein a width of an opening of the recessed portion is narrower than a width of the metal wiring.

11. The film structural member of claim 8,
    wherein a depth of the recessed portion is larger than a total thickness of a thickness of the metal wiring and a thickness of the particle layer.

12. The film structural member of claim 8,
    wherein the transparent substrate includes a polyethylene terephthalate (PET) resin or a polycarbonate resin.

13. The film structural member of claim 12, wherein a thickness of the transparent substrate is at least 20 μm and no greater than 100 μm.

14. A flexible touch panel comprising the film structural member of claim 13.

* * * * *